United States Patent
Dhaens et al.

(10) Patent No.: US 12,083,851 B1
(45) Date of Patent: Sep. 10, 2024

(54) SINGLE AXLE ROLL CONTROL SYSTEM WITH MULTIPLE CIRCUIT-SPECIFIC PRESSURIZING DEVICES

(71) Applicant: DRiV Automotive Inc., Northville, MI (US)

(72) Inventors: Miguel Dhaens, Lommel (BE); Monzer Al Sakka, Sint-Truiden (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/197,133

(22) Filed: May 15, 2023

(51) Int. Cl.
  *B60G 17/015* (2006.01)
  *B60G 17/08* (2006.01)
  *B60G 21/073* (2006.01)

(52) U.S. Cl.
  CPC ....... *B60G 21/073* (2013.01); *B60G 17/0157* (2013.01); *B60G 17/08* (2013.01); *B60G 2202/24* (2013.01); *B60G 2204/8304* (2013.01); *B60G 2500/114* (2013.01); *B60G 2800/9124* (2013.01)

(58) Field of Classification Search
  CPC .... B60G 2400/5182; B60G 2400/5122; B60G 2800/9124; B60G 17/0157; B60G 2204/8304; B60G 2202/24; B60G 17/08; B60G 21/073
  See application file for complete search history.

(56) References Cited

U.S. PATENT DOCUMENTS

| | | | |
|---|---|---|---|
| 2,503,016 A | 4/1950 | Weeks et al. | |
| 3,328,019 A * | 6/1967 | Wilson | B60G 21/073 |
| | | | 267/64.16 |
| 3,475,059 A * | 10/1969 | Klein | B60T 8/1837 |
| | | | 303/9.69 |
| 3,871,635 A | 3/1975 | Unruh et al. | |
| 3,921,746 A | 11/1975 | Lewus | |

(Continued)

FOREIGN PATENT DOCUMENTS

| | | | | |
|---|---|---|---|---|
| CN | 105857007 A | * | 8/2016 | ......... B60G 17/0155 |
| DE | 19853876 A1 | | 5/2000 | |

(Continued)

*Primary Examiner* — Amy R Weisberg
*Assistant Examiner* — Maxwell L Meshaka
(74) *Attorney, Agent, or Firm* — Harness, Dickey & Pierce, P.L.C.

(57) ABSTRACT

A single axle suspension system that includes right and left dampers, first and second hydraulic circuits, a first pressurizing mechanism that is connected in fluid communication with the first hydraulic circuit, and a second pressurizing mechanism that is connected in fluid communication with the second hydraulic circuit. The first and second pressurizing mechanisms are configured to provide active roll control by adding and removing hydraulic fluid to and from the first and second hydraulic circuits to increase and decrease pressure inside the first and second hydraulic circuits independent of damper movements. This in turn causes a simultaneous increase in the fluid pressure inside either the first working chamber of the right and the second working chamber of the left damper or the first working chamber of the left damper and the second working chambers of the right damper to provide roll stiffness that counters vehicle roll during cornering.

20 Claims, 3 Drawing Sheets

(56) References Cited

U.S. PATENT DOCUMENTS

| | | | |
|---|---|---|---|
| 4,295,538 A | 10/1981 | Lewus | |
| 4,741,206 A * | 5/1988 | Ishiguro | B60G 17/0185 340/686.1 |
| 5,562,305 A | 10/1996 | Heyring et al. | |
| 5,573,388 A | 11/1996 | Tar et al. | |
| 5,682,980 A | 11/1997 | Reybrouck | |
| 5,899,472 A * | 5/1999 | Burke | B60G 21/073 280/5.506 |
| 6,010,139 A | 1/2000 | Heyring et al. | |
| 6,196,555 B1 * | 3/2001 | Gaibler | B60G 17/018 280/6.154 |
| 6,669,208 B1 | 12/2003 | Monk et al. | |
| 7,240,906 B2 * | 7/2007 | Klees | B60G 21/10 280/5.502 |
| 7,384,054 B2 | 6/2008 | Heyring et al. | |
| 7,686,309 B2 | 3/2010 | Munday et al. | |
| 7,751,959 B2 * | 7/2010 | Boon | B60G 17/0162 251/74 |
| 7,909,341 B2 | 3/2011 | Van Der Knaap | |
| 7,959,164 B2 | 6/2011 | Keane et al. | |
| 8,123,235 B2 | 2/2012 | Monk et al. | |
| 8,544,863 B2 | 10/2013 | Revill et al. | |
| 8,967,629 B2 | 3/2015 | Oshita et al. | |
| 9,352,633 B2 | 5/2016 | Kim | |
| 10,358,010 B2 * | 7/2019 | Boon | B60G 21/06 |
| 10,434,835 B2 | 10/2019 | Six et al. | |
| 10,589,591 B2 * | 3/2020 | Sakka | B60G 17/08 |
| 10,850,586 B2 * | 12/2020 | Sorniotti | B60G 17/01908 |
| 11,084,349 B2 * | 8/2021 | Dhaens | B60G 15/04 |
| 11,117,435 B2 | 9/2021 | Liebold et al. | |
| 11,192,424 B2 * | 12/2021 | Tabata | B60G 21/073 |
| 11,220,152 B2 | 1/2022 | Witte | |
| 11,338,637 B2 * | 5/2022 | Dhaens | B60G 17/08 |
| 11,351,829 B2 * | 6/2022 | Stahl | B60G 17/01941 |
| 11,351,830 B2 * | 6/2022 | Sorniotti | B60G 17/01908 |
| 11,376,917 B2 * | 7/2022 | Simon | B60G 17/0565 |
| 11,541,797 B2 * | 1/2023 | Dhaens | B60G 17/06 |
| 11,577,572 B2 * | 2/2023 | Dhaens | B01J 20/28004 |
| 11,679,820 B2 | 6/2023 | Streit | |
| 11,685,220 B2 * | 6/2023 | Calchand | B60G 11/265 280/5.515 |
| 11,794,542 B2 * | 10/2023 | Boulay | F16F 9/19 |
| 11,865,887 B2 * | 1/2024 | Boon | B60G 17/0152 |
| 11,970,034 B2 | 4/2024 | Kalnitski et al. | |
| 2004/0113377 A1 * | 6/2004 | Klees | B60G 21/073 280/5.514 |
| 2006/0287791 A1 * | 12/2006 | Boon | B60G 21/106 701/37 |
| 2007/0170680 A1 | 7/2007 | Knaap | |
| 2012/0098216 A1 | 4/2012 | Ryan et al. | |
| 2014/0225336 A1 | 8/2014 | Ryan et al. | |
| 2014/0232082 A1 * | 8/2014 | Oshita | B60G 17/0162 280/124.161 |
| 2018/0162188 A1 * | 6/2018 | Chikamatsu | B60G 11/30 |
| 2018/0229574 A1 | 8/2018 | Okimura | |
| 2018/0345747 A1 * | 12/2018 | Boon | B60G 17/018 |
| 2019/0225044 A1 * | 7/2019 | Witte | B60G 21/026 |
| 2019/0263213 A1 * | 8/2019 | Sakka | B60G 17/08 |
| 2019/0305558 A1 | 10/2019 | Abaitancei et al. | |
| 2020/0062069 A1 * | 2/2020 | Sorniotti | B60G 17/01908 |
| 2020/0180386 A1 * | 6/2020 | Tabata | B60G 17/0165 |
| 2020/0238780 A1 * | 7/2020 | Dhaens | F16F 9/0218 |
| 2020/0238876 A1 * | 7/2020 | Dhaens | B60R 11/04 |
| 2020/0247207 A1 * | 8/2020 | Dhaens | B60G 17/016 |
| 2021/0023902 A1 * | 1/2021 | Sorniotti | B60G 17/01908 |
| 2021/0061046 A1 * | 3/2021 | Simon | B66F 17/00 |
| 2021/0155068 A1 * | 5/2021 | Stabel | B60G 11/02 |
| 2021/0362557 A1 * | 11/2021 | Stahl | B60G 17/016 |
| 2022/0001713 A1 * | 1/2022 | Huth | B60G 17/0432 |
| 2022/0144035 A1 * | 5/2022 | Al Sakka | B60G 17/08 |
| 2022/0281278 A1 * | 9/2022 | Boulay | B60G 13/005 |
| 2022/0281280 A1 * | 9/2022 | Praet | B60G 17/01908 |
| 2022/0380004 A1 | 12/2022 | Walker et al. | |
| 2022/0410647 A1 * | 12/2022 | Dhaens | F28D 7/10 |
| 2023/0110337 A1 * | 4/2023 | Calchand | B60G 17/0185 701/37 |
| 2023/0111977 A1 * | 4/2023 | Boon | B60G 17/01908 701/37 |
| 2023/0112405 A1 * | 4/2023 | Calchand | B60G 17/0152 280/5.515 |
| 2023/0113819 A1 * | 4/2023 | Vandersmissen | B60G 17/0152 280/5.507 |
| 2023/0114717 A1 * | 4/2023 | Boon | B60G 17/0152 701/37 |
| 2023/0115594 A1 * | 4/2023 | Calchand | B60G 21/073 701/37 |
| 2023/0278387 A1 * | 9/2023 | Birch | B60G 17/08 280/5.507 |
| 2023/0302865 A1 * | 9/2023 | Tong | B60G 17/08 |
| 2023/0302866 A1 * | 9/2023 | Tong | B60G 21/073 |
| 2023/0302867 A1 * | 9/2023 | Tong | B60G 11/265 |

FOREIGN PATENT DOCUMENTS

| | | | | |
|---|---|---|---|---|
| DE | 102008027134 A1 | 12/2009 | | |
| DE | 102009010850 A1 | 9/2010 | | |
| DE | 102017214264 A1 | 2/2019 | | |
| EP | 4032732 A1 * | 7/2022 | | B60G 11/27 |
| FR | 2907377 B1 | 1/2012 | | |
| GB | 2238990 A * | 6/1991 | | B60G 17/0272 |
| GB | 2315248 A * | 1/1998 | | B60G 21/073 |
| GB | 2597454 A | 2/2022 | | |
| GB | 2597455 A | 2/2022 | | |
| JP | 2005059613 A | 3/2005 | | |
| JP | 2010522112 A | 7/2010 | | |
| JP | 5929628 B2 | 6/2016 | | |

* cited by examiner

SINGLE AXLE ROLL CONTROL SYSTEM WITH MULTIPLE CIRCUIT-SPECIFIC PRESSURIZING DEVICES

FIELD

The present disclosure relates generally to suspension systems for motor vehicles and more particularly to single axle suspension systems that replace or augment mechanical stabilizer bars/anti-roll bars.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean during corning (i.e., in turns). The lateral acceleration the vehicle experiences in turns causes a roll moment where the vehicle will lean/squat to the right when turning left and to the left when turning right. The roll moment decreases grip and cornering performance and also can be uncomfortable to the driver and passengers. Many vehicles are equipped with stabilizer bars/anti-roll bars, which are mechanical systems that help counteract the roll moment experienced during cornering. Stabilizer bars/anti-roll bars are typically mechanical linkages that extend laterally across the width of the vehicle between the right and left dampers. When one of the dampers extends, the stabilizer bar/anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the right and left dampers. Second, stabilizer bars/anti-roll bars are reactive and therefore only work when the suspension starts moving (i.e. leaning). Such mechanical systems do not limit body roll the moment a turn is initiated. Accordingly, there remains a need for improved vehicle suspension systems that can augment or replace traditional mechanical stabilizer bars/anti-roll bars.

SUMMARY

This section provides a general summary of the disclosure, and is not a comprehensive disclosure of its full scope or all of its features.

In accordance with one aspect of the subject disclosure, a single axle suspension system is provided. The single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The first working chamber of the right damper is connected in fluid communication with the second working chamber of the left damper by a first hydraulic circuit. The second working chamber of the right damper is connected in fluid communication with the first working chamber of the left damper by a second hydraulic circuit. A first pressurizing mechanism is connected in fluid communication with the first hydraulic circuit and a second pressurizing mechanism is connected in fluid communication with the second hydraulic circuit. Each of the first and second pressurizing mechanisms includes a variable volume chamber and a driven piston. Each driven piston is moveable in first and second directions to increase and decrease the volume of the variable volume chamber and provide active roll control by adding or removing hydraulic fluid to or from the first and second hydraulic circuits, which increases or decreases pressure inside the first and second hydraulic circuits independent of damper movements.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The single axle suspension system includes a first hydraulic line that extends between and fluidly connects the first working chamber of the right damper and the second working chamber of the left damper and a second hydraulic line that extends between and fluidly connects the second working chamber of the right damper and the first working chamber of the left damper. A first pressurizing mechanism is connected in fluid communication with the first hydraulic line and a second pressurizing mechanism is connected in fluid communication with the second hydraulic line. The first pressurizing mechanism includes a first variable volume chamber and a first ball/screw mechanism that is configured to adjust the volume of the first variable volume chamber and provide active roll control by adding or removing hydraulic fluid to or from the first hydraulic line to increase or decrease pressure inside the first hydraulic line independent of damper movements. The second pressurizing mechanism includes a second variable volume chamber and a second ball/screw mechanism that is configured to adjust the volume of the second variable volume chamber and provide active roll control by adding or removing hydraulic fluid to or from the second hydraulic line to increase or decrease pressure inside the second hydraulic line independent of damper movements.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The first working chamber of the right damper is connected in fluid communication with the second working chamber of the left damper by a first hydraulic circuit. The second working chamber of the right damper is connected in fluid communication with the first working chamber of the left damper by a second hydraulic circuit. A first pressurizing mechanism is connected in fluid communication with the first hydraulic circuit and a second pressurizing mechanism is connected in fluid communication with the second hydraulic circuit. Each of the first and second pressurizing mechanisms includes a variable volume chamber and a driven piston. Each driven piston is moveable in first and second directions to increase and decrease the volume of the variable volume chamber and provide active roll control by adding or removing hydraulic fluid to or from the first and second hydraulic circuits, which increases or decreases pressure inside the first and second hydraulic circuits independent of damper movements. The single axle suspension system further includes a gearset with a first driven gear, a second driven gear, and a pinion gear. The first driven gear is connected to and rotates with the ball/screw mechanism of the first pressurizing mechanism. The second driven gear is connected to and rotates with the ball/screw mechanism of the second pressurizing mechanism. The pinion gear is arranged in meshing engagement with both the first and second driven gears and a motor is connected to and configured to rotatably drive the pinion gear, which drives rotation of the first and second driven gears and causes the driven pistons of the first and second pressurizing mechanisms to move simultaneously in opposite directions.

Advantageously, the single axle suspension systems described herein are able to reduce/eliminate vehicle roll while cornering for improved grip, performance, handling, and braking. The reduction of roll angles improves the comfort, steering feel, agility, and stability of the vehicle. Roll control is provided by actuating the first and second pressurizing mechanisms to increase the roll stiffness of the suspension system based on static pressure in the system. Because the pressurizing mechanisms actively adjusts roll stiffness of the vehicle by changing the static pressure in the system when greater roll stiffness is need, the baseline roll stiffness can be reduced compared to a vehicle with a conventional anti-roll bar. Therefore, ride comfort and suspension compliance is improved. Comfort is also improved because the active forces are independent of the damping forces. Anti-roll stiffness can also be applied to reduce body oscillations (e.g. sway) resulting in improved comfort. Finally, the single axle suspension systems described herein provide anti-roll control and therefore can augment or replace mechanical stabilizer bars/anti-roll bars.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
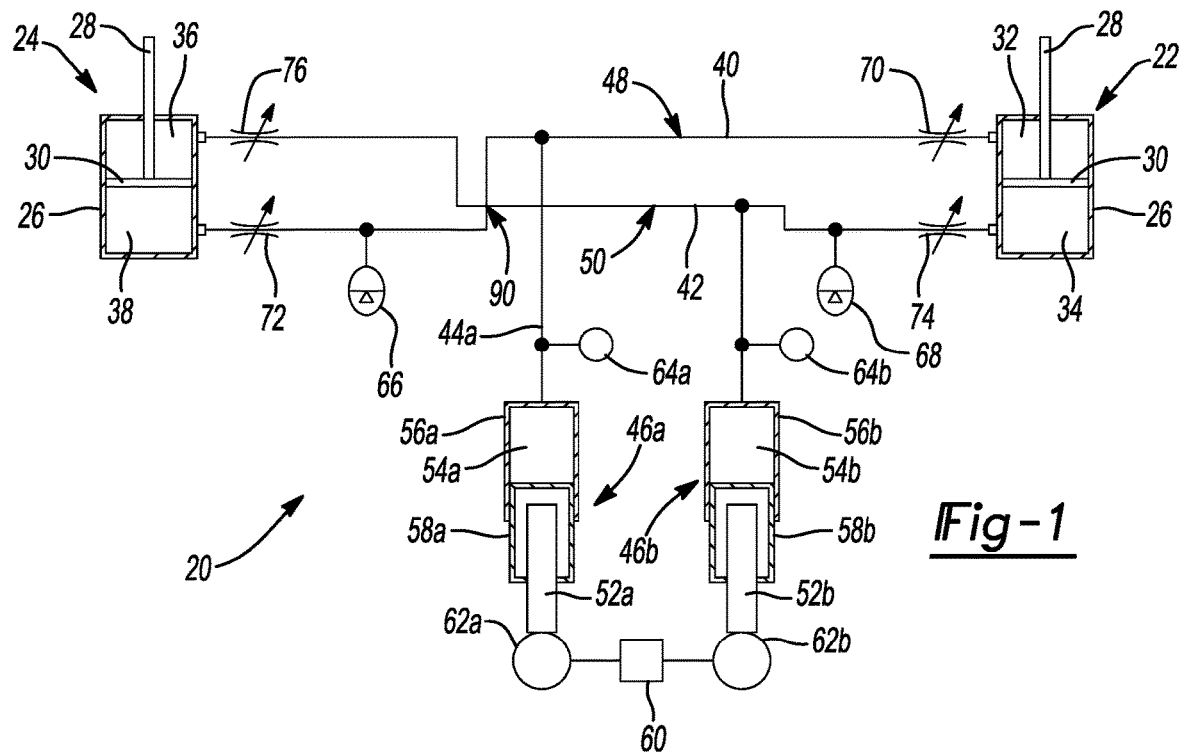
FIG. 1 is a schematic diagram illustrating an exemplary single axle suspension system that is constructed in accordance with the present disclosure, where the single axle suspension system includes first and second pressurizing mechanisms that each have a ball/screw mechanism and a variable volume chamber with a first floating piston.

Referring to the Figures, wherein like numerals indicate corresponding parts throughout the several views, a number of single axle suspension system are disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, several single axle suspension systems are illustrated. It should be appreciated that the single axle suspension systems shown in FIGS. 1-5 may be located at the front end of a vehicle to control suspension movements and provide anti-roll/lean control for the front wheels of the vehicle, and additionally or alternatively, the single axle suspension systems may be located at the rear end of the vehicle to control suspension movements and provide anti-roll/lean control for the back wheels of the vehicle.

Each of the single axle suspension systems disclosed herein include a right damper and a left damper. The right and left dampers control (i.e., dampen) up and down (i.e., vertical) movements of the front or rear wheels of the vehicle. Thus, one single axle suspension system may be provided at the front of the vehicle and another single axle suspension system may be provided at the rear of the vehicle. The anti-roll/lean capabilities of the single axle suspension systems described herein will be explained in greater detail below; however, it should be appreciated that each single axle suspension system can operate independently and on its own and that each single axle suspension systems can be used to either augment or completely replace mechanical stabilizer bars/anti-roll bars. Such mechanical systems require relatively straight, unobstructed runs along each axle between the right and left dampers. Accordingly, the single axle suspension systems disclosed herein offer packaging benefits because the right and left dampers only need to be hydraulically connected to one another.

It should be appreciated that a vehicle may be equipped with two identical single axle suspension systems placed at the front and rear of the vehicle; however, other configurations are possible where the vehicle may include only one of the single axle suspension systems disclosed herein and a convention suspension system at the other axle, or where the single axle suspension system at the front of the vehicle is different from the single axle suspension system at the rear of the vehicle.

With reference to FIG. 1, a single axle suspension system 20 is illustrated with right and left dampers 22, 24. Each of the right and left dampers 22, 24 of the single axle suspension system 20 includes a damper housing 26, a piston rod 28, and a piston 30 that is mounted on the piston rod 28. The piston 30 is arranged in sliding engagement with the inside of the damper housing 26 such that the pistons 30 divide the damper housings 26 into first and second working chambers 32, 34, 36, 38. Although other configurations are possible, in the illustrated embodiment the pistons 30 in the right and left dampers 22, 24 are closed pistons with no fluid flow paths defined within or by their structure.

The single axle suspension system 20 also includes a plurality of hydraulic lines 40, 42, 44a, 44b. The plurality of hydraulic lines 40, 42, 44a, 44b includes: a first hydraulic line 40 that extends between and fluidly connects to the first working chamber 32 of the right damper 22 and the second working chamber 38 of the left damper 24, a second hydraulic line 42 that extends between and fluidly connects to the second working chamber 34 of the right damper 22 and the first working chamber 36 of the left damper 24, a third hydraulic line 44a that extends between and fluidly connects the first hydraulic line 40 to a first pressurizing mechanism 46a, and a fourth hydraulic line 44b that extends between and fluidly connects the second hydraulic line 42 to a second pressurizing mechanism 46b. As such, the first and second hydraulic lines 40, 42 cross-over one another at a cross-over point 90. In the illustrated example, the hydraulic lines 40, 42, 44a, 44b are made of flexible tubing (e.g., hydraulic hoses), but other conduit structures and/or fluid passageways can be used alone or in combination with one another.

The first hydraulic line 40 and the third hydraulic line 44a thus form at least part of a first hydraulic circuit 48 that interconnects the first working chamber 32 of the right damper 22 and the second working chamber 38 of the left damper 24 with the first pressurizing mechanism 46a. Meanwhile, the second hydraulic line 42 and the fourth hydraulic line 44b form at least part of a second hydraulic circuit 50 that interconnects the second working chambers 34 of the right damper 22 and the first working chamber 36 of the left damper 24 with the second pressurizing mechanism 46b. In other words, the first pressurizing mechanism 46a is connected in fluid communication with the first hydraulic circuit 48 and the second pressurizing mechanism 46b is connected in fluid communication with the second hydraulic circuit 50. It should also be appreciated that there are no hydraulic lines or other connections extending between or otherwise connecting the first and second hydraulic lines 40, 42 or the first and second hydraulic circuits 48, 50 outside of the dampers 22, 24. The first and second hydraulic circuits 48, 50 are isolated from one another and therefore may or may not operate as closed loop systems depending on the arrangement of fluid flowpaths within the right and left dampers 22, 24. The first and second pressurizing mechanisms 46a of the single axle suspension system 20 are circuit dependent with one pressurizing mechanism per circuit. In other words, the first hydraulic circuit 48 includes a dedicated pressurizing mechanism 46a and the second hydraulic circuit 50 includes its own dedicated pressurizing mechanism 46b.

The first working chamber 32 of the right damper 22 and the second working chamber 38 of the left damper 24 are connected in fluid communication with one another and hydraulic fluid can flow between the first working chamber 32 of the right damper 22 and the second working chamber 38 of the left damper 24 via the first hydraulic line 40 and between the first hydraulic line 40 and the first pressurizing mechanism 46a via the third hydraulic line 44a. The second working chamber 34 of the right damper 22 and the first working chamber 36 of the left damper 24 are connected in fluid communication with one another and hydraulic fluid can flow between the second working chamber 34 of the right damper 22 and the first working chamber 36 of the left damper 24 via the second hydraulic line 42 and between the second hydraulic line 42 and the second pressurizing mechanism 46a via the fourth hydraulic line 44b.

Each of the first and second pressurizing mechanisms 46a, 46b includes a ball/screw mechanism 52a, 52b to adjust the volume of a variable volume chamber 54a, 54b. The first and second pressurizing mechanisms 46a, 46b provide active roll control by adding and removing hydraulic fluid to and from the first and second hydraulic circuits 48, 50. Each of the first and second pressurizing mechanisms 46a, 46b also includes a cylinder 56a, 56b and the ball/screw mechanism 52a, 52b is configured to actuate a driven piston 58a, 58b that is slidably received in the cylinder 56a, 56b. Each driven piston 58a, 58b is moveable in a first direction to decrease the volume of the variable volume chamber 54a, 54b within the cylinder 56a, 56b and push hydraulic fluid out of the variable volume chamber 54a, 54b and into the third hydraulic line 44a (with respect to the first pressurizing mechanism 46a) to increase static pressure in the first hydraulic circuit 48 and into the fourth hydraulic line 44b (with respect to the second pressurizing mechanism 46b) to increase static pressure in the second hydraulic circuit 50. Each driven piston 58a, 58b is also moveable in a second direction to increase the volume of the variable volume chamber 54a, 54b within the cylinder 56a, 56b and draw hydraulic fluid from either the third hydraulic line 44a or the fourth hydraulic line 44b into the variable volume chamber 54a, 54b to decrease static pressure in the first or second hydraulic circuits 48, 50.

Thus, actuation of the first pressurizing mechanism 46a either increases and decreases the static pressure inside the first hydraulic line 40, the third hydraulic line 44a, the first work chamber 32 of the right damper 22 and the second working chamber 38 of the left damper 24 in a manner that is independent of damper movements. Similarly, actuation of the second pressurizing mechanism 46b either increases and decreases the static pressure inside the second hydraulic line 42, the fourth hydraulic line 44b, the first working chamber 36 of the left damper 24, and the second working chambers 34 of the right damper 22 in a manner that is independent of damper movements.

A controller 60 is electronically connected to the first and second pressurizing mechanisms 46a, 46b. The controller 60 includes a processor and memory that is programmed to initiate active roll control operations by actuating the first and second pressurizing mechanism 46a, 46b either simultaneously or independently. In the illustrated examples, the controller 60 is electronically connected to a first motor 62a that drives the ball/screw mechanism 52a of the first pressurizing mechanism 46a and is also electronically connected to a second motor 62b that drives the ball/screw mechanism 52b of the second pressurizing mechanism 46b. However, it should be appreciated that the suspension system 20 could alternatively include two separate controllers, one for each pressurizing mechanism 46a, 46b.

The processor of the controller 60 initiates the active roll control operations by energizing the motors 62a, 62b to drive the driven pistons 58a, 58b in the first and second directions to increase or decrease the static pressure in the first and second hydraulic circuits 48, 50. Typically, for active roll control, the controller 60 will energizing the motors 62a, 62b simultaneously to drive the driven pistons 58a, 58b in opposite directions to increase the static pressure in the first hydraulic circuit 48 while decreasing the static pressure in the second hydraulic circuit 50, in the case of a right turn for example, or vice versa, to resist vehicle roll and maintain a flat corning posture of the vehicle. However, the controller 60 may also energize just one of the motors 62a, 62b to drive just one of the driven pistons 58a, 58b in either the first or second direction to increase of decrease the static pressure in just one of the first and second hydraulic circuits 48, 50 to increase suspension articulation, for example, if the vehicle is traveling off-road or over an obstacle or pot-hole.

The active roll control operations performed by the controller 60 may be responsive to measurements taken by a first pressure sensor 64a that is connected to the first hydraulic circuit 48 and a second pressure sensor 64b that is connected to the second hydraulic circuit 50. In the illustrated examples, the first pressure sensor 64a is connected in fluid communication with the third hydraulic line 44a and is therefore configured to measure the static pressure in the first hydraulic circuit 48 and the second pressure sensor 64b is connected in fluid communication with the fourth hydraulic line 44b and is therefore configured to measure the static pressure in the second hydraulic circuit 50.

As shown in FIG. 1, the first hydraulic circuit 48 includes a first accumulator 66 and the second hydraulic circuit 50 includes a second accumulator 68. In this embodiment, the first and second accumulators 66, 68 are external to the first and second pressurizing mechanisms 46a, 46b. In particular, the first accumulator 66 is connected in fluid communication with the first hydraulic line 40 and the second accumulator 68 is connected in fluid communication with the second hydraulic line 42. The first and second accumulators 66, 68 may be constructed in a number of different ways. For example and without limitation, the first and second accumulators 66, 68 may have accumulation chambers and pressurized gas chambers that are separated by floating pistons or flexible membranes.

The first hydraulic circuit 48 includes a first pair of variable flow control valves 70, 72 that are configured to regulate fluid flow between the first working chamber 32 of the right damper 22 and the second working chamber 38 of the left damper 24 with the first hydraulic circuit 48. Similarly, the second hydraulic circuit 50 includes a second pair of variable flow control valves 74, 76 that are configured to regulate fluid flow between the first working chambers 36 of the left damper 24 and the second working chamber 34 of the right damper 22 with the second hydraulic circuit 50. The first variable flow control valve 70 is positioned between the first working chamber 32 of the right damper 22 and the first hydraulic line 40, while the second variable flow control valve 72 is positioned between the second working chamber 38 of the left damper 24 and the first hydraulic line 40. The third variable flow control valve 74 is positioned between the second working chamber 34 of the right damper 22 and the second hydraulic line 42, while the fourth variable flow control valve 76 is positioned between the first working chamber 36 of the left damper 24 and the second hydraulic line 42. By way of example and without limitation, the variable flow control valves 70, 72, 74, 76 may be electromechanical valves with a combination of passive spring-disk elements and a solenoid. The solenoid of the variable flow control valves 70, 72, 74, 76 may be electrically connected to and actuated by the controller 60 to change the damping characteristics of the right damper 22 and/or left damper 24 (e.g., to soften or firm up the ride).

Figure 2:
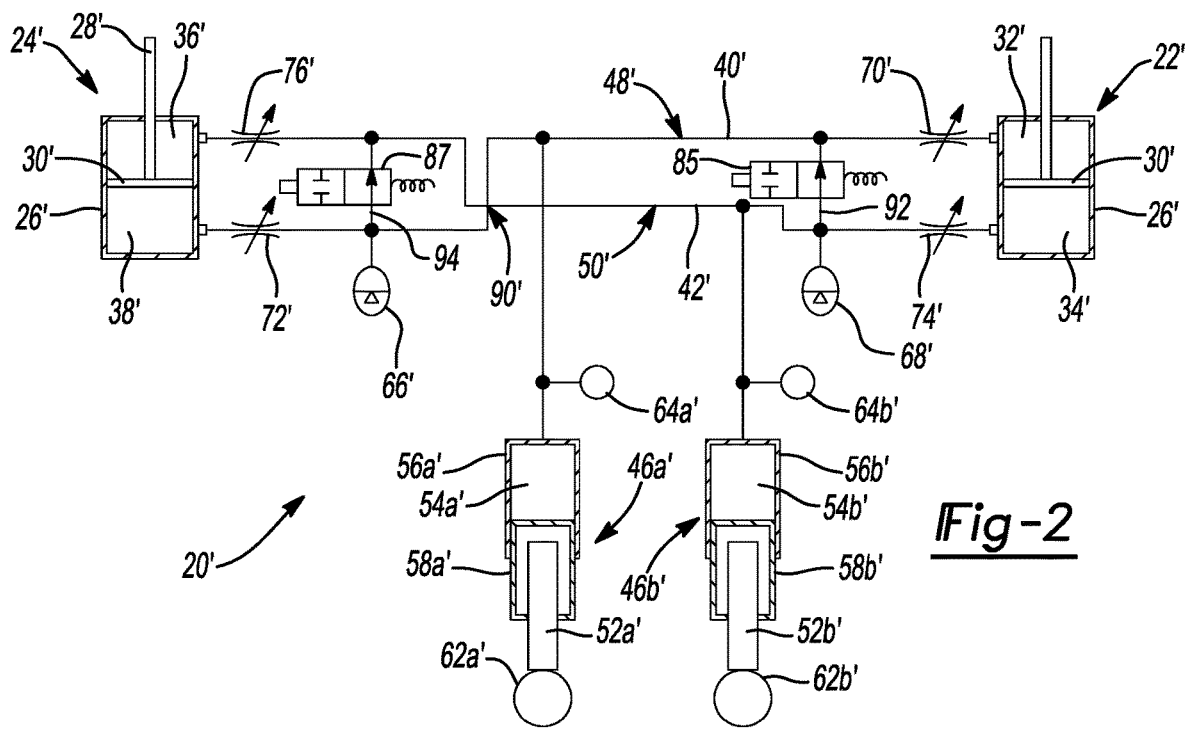
FIG. 2 is a schematic diagram illustrating another exemplary single axle suspension system that is similar to the single axle suspension system illustrated in FIG. 1, but additionally includes first and second bridge lines with shut-off valves.

FIG. 2 illustrates another single axle suspension system 20' that shares many of the same components as the single axle suspension system 20 illustrated in FIG. 1, but in FIG. 2 the single axle suspension system 20' includes first and second bridge lines 92', 94' that are equipped with first and second shut-off valves 85', 87' (i.e., on/off valves), respectively. Rather than repeat the description set forth above, the reference numbers in FIG. 2 are the same as those shown in FIG. 1, but in FIG. 2 the reference numbers have been appended with a prime (') symbol. Thus, the same description for element 20 above applies to element 20' in FIG. 2 and so on and so forth.

The first and second bridge lines 92', 94' in FIG. 2 extend between and interconnect the first hydraulic line 40' and therefore the first hydraulic circuit 48' and the second hydraulic line 42' and therefore the second hydraulic circuit 50' on each side of the cross-over point 90'. In other words, the first bridge line 92' connects to the first and second hydraulic lines 40', 42' at positions located between the right damper 22' and the cross-over point 90', while the second bridge line 94' connects to the first and second hydraulic lines 40', 42' at positions located between the left damper 24' and the cross-over point 90'. The first shut-off valve 85' is positioned in the first bridge line 92' between the first and second hydraulic circuits 48', 50' and the second shut-off valve 87' is positioned in the second bridge line 94' between the first and second hydraulic circuits 48', 50'. When the first and second shut-off valves 85', 87' are closed, a pressure differential between the first and second hydraulic circuits 48', 50' can be maintained to provide roll resistance. This pressure differential will equalize when the first and second shut-off valves 85', 87' are open, which can be used to provide a comfort setting/operating mode. By way of example and without limitation, the shut-off valves 85', 87' may be electromechanical valves with a solenoid that may be electrically connected to and actuated by the controller (not shown in FIG. 2) to open and close the shut-off valves 85', 87'. Finally, in FIG. 2, the first accumulator 66' is connected at the junction between the first bridge line 92' and the second hydraulic line 42' and the second accumulator 68' is connected at the junction between the second bridge line 94' and the second hydraulic line 42'.

Figure 3:
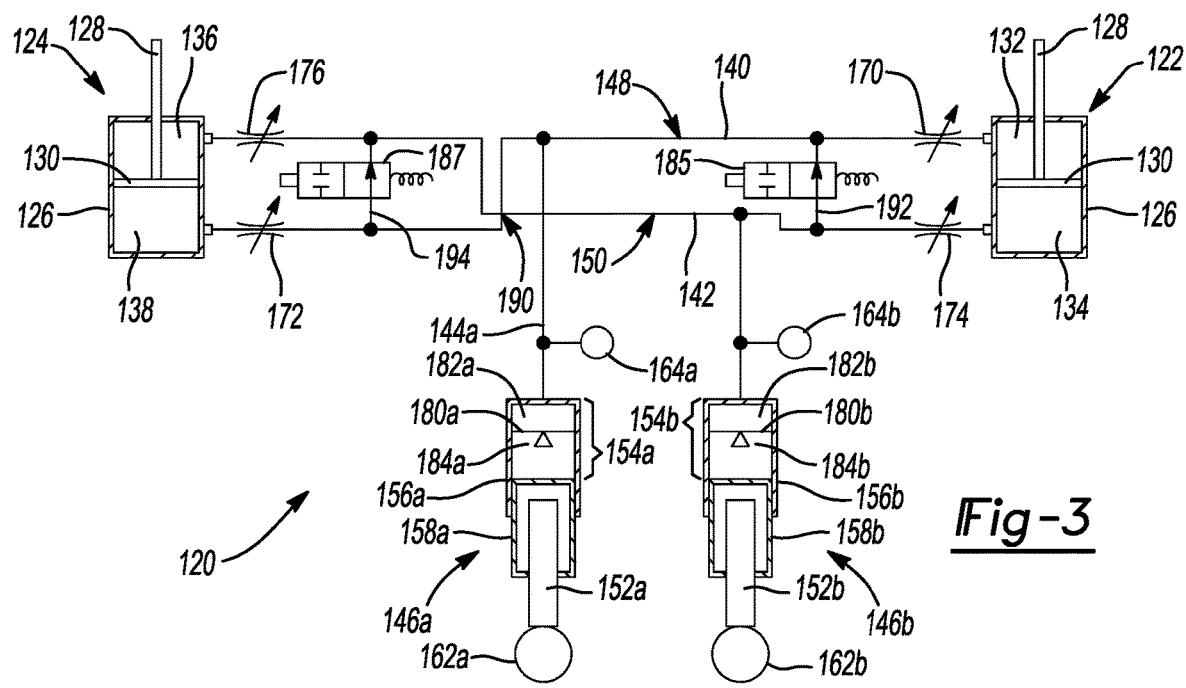
FIG. 3 is a schematic diagram illustrating another exemplary single axle suspension system that is similar to the single axle suspension system illustrated in FIG. 2, but the first and second pressurizing mechanisms include floating pistons in the variable volume chamber and therefore perform accumulator functions.

FIG. 3 illustrates another single axle suspension system 120 that shares many of the same components as the single axle suspension system 20' illustrated in FIG. 2, but in FIG. 3 the first and second accumulators 66', 68' have been eliminated because the first and second pressurizing mechanisms 146a, 146b perform accumulator functions in addition to increasing or decreasing the static pressure in the first and second hydraulic circuits 148, 150. Rather than repeat the description set forth above, the following paragraphs describe the structure and function of the components in FIG. 3 that are new and/or different from those shown and described in connection with FIGS. 1 and 2. It should be appreciated that the reference numbers in FIG. 3 are "100" series numbers (e.g., 120, 122, 124, etc.), but otherwise share the same base reference numbers as the corresponding elements in FIGS. 1 and 2. Thus, the same description for elements 20, 20' above applies to element 120 in FIG. 3 and so on and so forth, except as otherwise noted.

As noted above, the first and second pressurizing mechanisms 146a, 146b of the single axle suspension system 120 illustrated in FIG. 3 perform additional accumulator functions, which eliminates the need for separate accumulators attached to the first and second hydraulic circuits 148, 150. As shown in FIG. 3, each of the first and second pressurizing mechanisms 146a, 146b further includes a floating piston 180a, 180b that divides each variable volume chamber 154a, 154b into a fluid chamber 182a, 182b that is filled with hydraulic fluid and a gas chamber 184a, 184b that is filled with a compressible gas. The gas chamber 184a, 184b is positioned between the floating piston 180a, 180b and the driven piston 158a, 158b. The fluid chamber 182a of the first pressurizing mechanism 146a is arranged in fluid communication with the third hydraulic line 144a, while the fluid chamber 182b of the second pressurizing mechanisms 146b is arranged in fluid communication with the fourth hydraulic line 144b. Thus, the first pressurizing mechanism 146a is configured to provide active roll control by adding and removing hydraulic fluid to and from the first hydraulic circuit 148, which in turn increases and decreases the static pressure inside the first hydraulic line 140, the third hydraulic line 144a, and the first working chamber 132 of the right damper 122 and the second working chamber 138 of the left damper 124 in a manner that is independent of damper movements. The second pressurizing mechanism 146b is configured to provide active roll control by adding and removing hydraulic fluid to and from the second hydraulic circuit 150, which in turn increases and decreases the static pressure inside the second hydraulic line 142, the fourth hydraulic line 144b, and the first working chamber 136 of the left damper 124 and the second working chamber 134 of the right damper 122 in a manner that is independent of damper movements.

Figure 4:
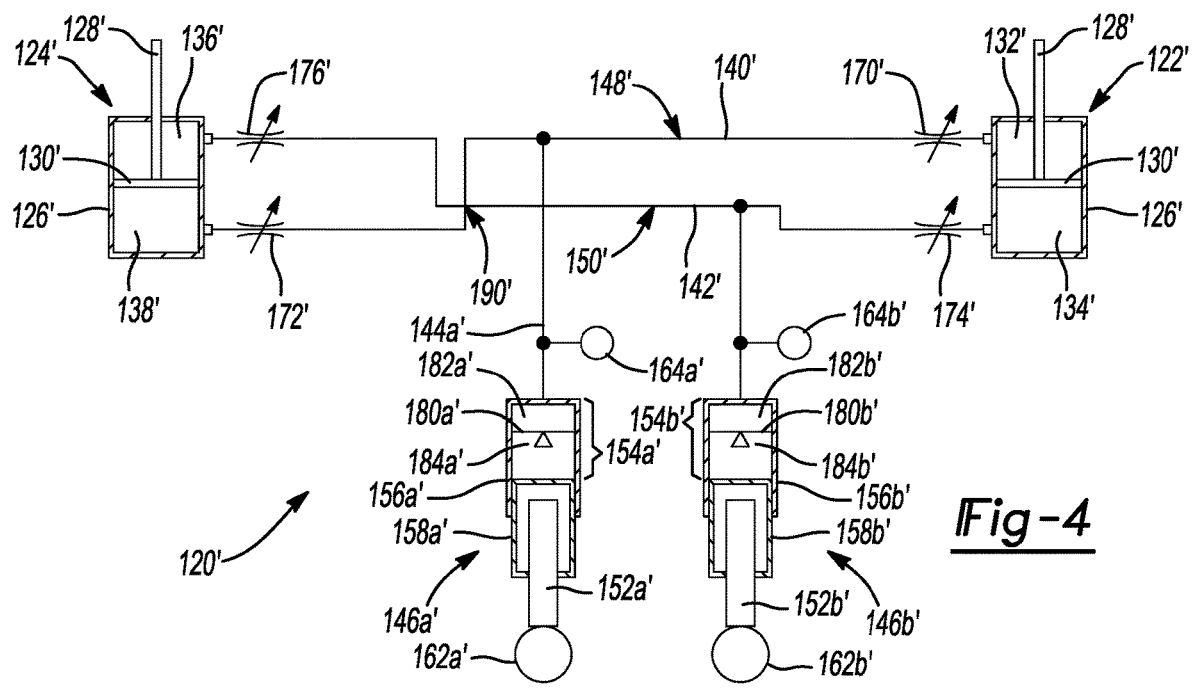
FIG. 4 is a schematic diagram illustrating another exemplary single axle suspension system that is similar to the single axle suspension system illustrated in FIG. 3, but does not include first and second bridge lines with shut-off valves.

FIG. 4 illustrates another single axle suspension system 120' that shares many of the same components as the single axle suspension system 120 illustrated in FIG. 3, but in FIG. 4 the first and second bridge lines 192, 194 and the first and second shut-off valves 185, 187 shown in FIG. 3 have been eliminated. Rather than repeat the description set forth above, the reference numbers in FIG. 4 are the same as those shown in FIG. 3, but in FIG. 4 the reference numbers have been appended with a prime (') symbol. Thus, the same description for element 120 above applies to element 120' in FIG. 4 and so on and so forth.

Figure 5:
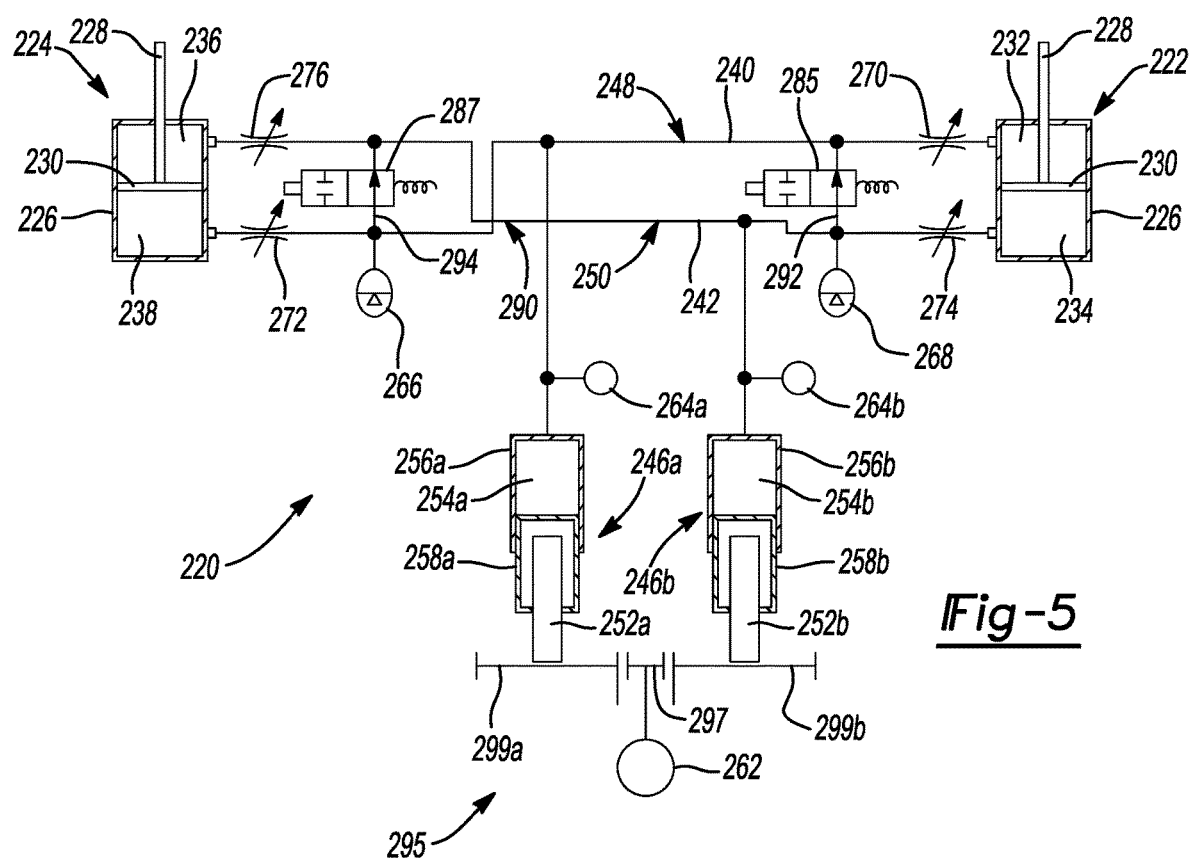
FIG. 5 is a schematic diagram illustrating another exemplary single axle suspension system that is similar to the single axle suspension system illustrated in FIG. 2, but the ball/screw mechanisms of the first and second pressurizing mechanisms are driven by a single electric motor through a gearset.

FIG. 5 illustrates another single axle suspension system 220 that shares many of the same components as the single axle suspension system 20 illustrated in FIG. 1, but in FIG. 5 the ball/screw mechanisms 252a, 252b of the first and second pressurizing mechanisms 246a, 246b are rotatably driven by a single motor 262 through a gearset 295. Rather than repeat the description set forth above, the following paragraphs describe the structure and function of the components in FIG. 5 that are new and/or different from those shown and described in connection with FIG. 1. It should be appreciated that the reference numbers in FIG. 5 are "200" series numbers (e.g., 220, 222, 224, etc.), but otherwise share the same base reference numbers as the corresponding elements in FIG. 1. Thus, the same description for element 20 above applies to element 220 in FIG. 5 and so on and so forth, except as otherwise noted.

In FIG. 5, both ball/screw mechanisms 252a, 252b of the first and second pressurizing mechanisms 246a, 246b are rotatably driven by a single motor 262 through gearset 295. The gearset 295 includes a pinion gear 297, a first driven gear 299a, and a second driven gear 299b. The pinion gear 297 is connected to and is rotatably driven by the motor 262. The first and second driven gears 299a, 299b are meshingly engaged with and rotationally driven by rotation of the pinion gear 297. The first driven gear 299a is mounted to the first ball/screw mechanism 252a of the first pressurizing mechanism 246a and the second driven gear 299b is mounted to the second ball/screw mechanisms 252b of the second pressurizing mechanism 246b. Thus, the first and second driven gears 299a, 299b are arranged to opposite sides of the pinion gear 297 and mesh with the pinion gear 297 at mesh points that are spaced approximately 180 degrees apart. Thus, in the illustrated example, the motor 262 rotatably drives the pinion gear 297, which drives rotation of the first and second driven gears 299a, 299b, and causes the driven pistons 258a, 258b to move linearly in opposite directions (i.e., rotation of the in pinion gear 297 in a counter-clockwise direction may cause the first driven piston 258a to move linearly in the first direction and the second driven piston 258b to move linearly in the second direction, while rotation of the in pinion gear 297 in a clockwise direction may cause the first driven piston 258a to move linearly in the second direction and the second driven piston 258b to move linearly in the first direction, or vice versa).

Many other modifications and variations of the present disclosure are possible in light of the above teachings and may be practiced otherwise than as specifically described while within the scope of the appended claims.

What is claimed is:

1. A single axle suspension system, comprising:
    right and left dampers each including a damper housing, a piston rod, and a piston that is mounted on the piston rod and arranged in sliding engagement inside the damper housing such that the piston divides the damper housing into first and second working chambers;
    a first hydraulic circuit connecting the first working chamber of the right damper and the second working chamber of the left damper;
    a second hydraulic circuit connecting the second working chamber of the right damper and the first working chamber of the left damper;
    a first pressurizing mechanism connected in fluid communication with the first hydraulic circuit; and
    a second pressurizing mechanism connected in fluid communication with the second hydraulic circuit,
    wherein each of the first and second pressurizing mechanisms includes a variable volume chamber with a driven piston that is moveable in first and second directions to increase and decrease the volume of the variable volume chamber and provide active roll control by adding and removing hydraulic fluid to and from the first and second hydraulic circuits to increase and decrease pressure inside the first and second hydraulic circuits independent of damper movements.

2. The single axle suspension system set forth in claim 1, wherein the first hydraulic circuit includes a first hydraulic line extending between and connecting the first working chamber of the right damper and the second working chamber of the left damper and a second hydraulic line extending between and connecting the second working chamber of the right damper and the first working chamber of the left damper and wherein the first and second hydraulic lines cross over one another at a cross-over point.

3. The single axle suspension system set forth in claim 2, wherein the first hydraulic circuit includes a third hydraulic line extending between and connecting the first hydraulic line and the variable volume chamber of the first pressurizing mechanism and the second hydraulic circuit includes a fourth hydraulic line extending between and connecting the second hydraulic line and the variable volume chamber of the second pressurizing mechanism.

4. The single axle suspension system set forth in claim 3, wherein movement of the driven piston of the first pressurizing mechanism in the first direction decreases the volume in the variable volume chamber of the first pressurizing mechanism and pushes hydraulic fluid out of the variable volume chamber of the first pressurizing mechanism and into the third hydraulic line to increase the pressure in the first hydraulic circuit, movement of the driven piston of the first pressurizing mechanism in the second direction increases the volume in the variable volume chamber of the first pressurizing mechanism and draws hydraulic fluid into the variable volume chamber of the first pressurizing mechanism from the third hydraulic line to decrease the pressure in the first hydraulic circuit, movement of the driven piston of the second pressurizing mechanism in the first direction decreases the volume in the variable volume chamber of the second pressurizing mechanism and pushes hydraulic fluid out of the variable volume chamber of the second pressurizing mechanism and into the fourth hydraulic line to increase the pressure in the second hydraulic circuit, and movement of the driven piston of the second pressurizing mechanism in the second direction increases the volume in the variable volume chamber of the second pressurizing mechanism and draws hydraulic fluid into the variable volume chamber of the second pressurizing mechanism from the fourth hydraulic line to decrease the pressure in the second hydraulic circuit.

5. The single axle suspension system set forth in claim 2, further comprising:
    first and second bridge lines that extend between and interconnect the first hydraulic line and the second hydraulic line at spaced apart locations positioned to each side of the cross-over point;
    a first shut-off valve positioned in the first bridge line between the first and second hydraulic lines; and
    a second shut-off valve positioned in the second bridge line between the first and second hydraulic lines,
    wherein a pressure differential between the first and second hydraulic circuits is enabled when the first and second shut-off valves are closed to provide roll resistance and wherein the pressure differential between the first and second hydraulic circuits will equalize when the first and second shut-off valves are open.

6. The single axle suspension system set forth in claim 1, wherein each of the first and second pressurizing mechanisms includes a ball/screw mechanism that is configured to operably drive movement of the driven piston in the first and second directions.

7. The single axle suspension system set forth in claim 6, wherein the ball/screw mechanism of each of the first and second pressurizing mechanisms includes a motor.

8. The single axle suspension system set forth in claim 7, further comprising:
    a controller that is electronically connected to the motor of each of the first and second pressurizing mechanisms, the controller including a processor and memory that is programmed to initiate an active roll control operation by energizing at least one of the motors to drive at least one of the driven pistons in the first direction or the second direction to increase or decrease the pressure in at least one of the first and second hydraulic circuits.

9. The single axle suspension system set forth in claim 6, wherein the ball/screw mechanism of the first pressurizing mechanism is connected to and rotatably driven by a first driven gear, the ball/screw mechanism of the second pressurizing mechanism is connected to and rotatably driven by a second driven gear, and the first and second driven gears are arranged in meshing engagement with a pinion gear that is connected to and rotatably driven by a motor.

10. The single axle suspension system set forth in claim 1, wherein the first hydraulic circuit includes a first pair of variable flow control valves that are configured to regulate fluid flow between the first hydraulic circuit and the first working chamber of the right damper and between the first hydraulic circuit and the second working chamber of the left damper and wherein the second hydraulic circuit includes a second pair of variable flow control valves that are configured to regulate fluid flow between the second hydraulic circuit and the first working chamber of the left damper and between the second hydraulic circuit and the second working chamber of the right damper.

11. The single axle suspension system set forth in claim 1, wherein each of the first and second pressurizing mechanisms further includes a floating piston that divides the variable volume chamber into a fluid chamber that is filled with hydraulic fluid and is arranged in fluid communication with one of the first and second hydraulic circuits and a gas chamber between the floating piston and the driven piston that is filled with a compressible gas such that the first and second pressurizing mechanisms also provide accumulator functionality.

12. The single axle suspension system set forth in claim 1, wherein the first hydraulic circuit includes a first standalone accumulator that is separate and remote from the first pressurizing mechanism and the second hydraulic circuit includes a second standalone accumulator that is separate and remote from the second pressurizing mechanism.

13. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic line extending between and connecting the first working chamber of the right damper and the second working chamber of the left damper;
a second hydraulic line extending between and connecting the second working chamber of the right damper and the first working chamber of the left damper;
a first pressurizing mechanism connected in fluid communication with the first hydraulic line; and
a second pressurizing mechanism connected in fluid communication with the second hydraulic line,
wherein the first pressurizing mechanism includes a first variable volume chamber and a first ball/screw mechanism that is configured to adjust the volume of the first variable volume chamber and provide active roll control by adding and removing hydraulic fluid to and from the first hydraulic line to increase and decrease pressure inside the first hydraulic line independent of damper movements,
wherein the second pressurizing mechanism includes a second variable volume chamber and a second ball/screw mechanism that is configured to adjust the volume of the second variable volume chamber and provide active roll control by adding and removing hydraulic fluid to and from the second hydraulic line to increase and decrease pressure inside the second hydraulic line independent of damper movements.

14. The single axle suspension system set forth in claim 13, wherein the first and second hydraulic lines cross over one another at a cross-over point.

15. The single axle suspension system set forth in claim 14, further comprising:
a first pair of variable flow control valves that are configured to regulate fluid flow between the first hydraulic line and the first working chamber of the right damper and between the first hydraulic line and the second working chamber of the left damper; and
a second pair of variable flow control valves that are configured to regulate fluid flow between the second hydraulic line and the first working chamber of the left damper and between the second hydraulic line and the second working chamber of the right damper.

16. The single axle suspension system set forth in claim 15, further comprising:

first and second bridge lines that extend between and interconnect the first hydraulic line and the second hydraulic line at spaced apart locations positioned to each side of the cross-over point;
a first shut-off valve positioned in the first bridge line between the first and second hydraulic lines; and
a second shut-off valve positioned in the second bridge line between the first and second hydraulic lines.

17. The single axle suspension system set forth in claim 13, wherein each of the first and second pressurizing mechanisms further includes a floating piston that divides the variable volume chamber into a fluid chamber that is filled with hydraulic fluid and is arranged in fluid communication with one of the first and second hydraulic lines and a gas chamber between the floating piston and the driven piston that is filled with a compressible gas such that the first and second pressurizing mechanisms also provide accumulator functionality.

18. The single axle suspension system set forth in claim 13, further comprising:
a controller that is electronically connected to the first and second pressurizing mechanisms, the controller including a processor and memory that is programmed to initiate an active roll control operation by actuating the ball/screw mechanism of at least one of the first and second pressurizing mechanisms.

19. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic circuit connecting the first working chamber of the right damper and the second working chamber of the left damper;
a second hydraulic circuit connecting the second working chamber of the right damper and the first working chamber of the left damper;
a first pressurizing mechanism connected in fluid communication with the first hydraulic circuit and a second pressurizing mechanism connected in fluid communication with the second hydraulic circuit, each of the first and second pressurizing mechanisms including a variable volume chamber with a driven piston that is moveable in first and second directions to increase and decrease the volume of the variable volume chamber and provide active roll control by adding and removing hydraulic fluid to and from the first and second hydraulic circuits;
a gearset including a first driven gear that is connected to and rotates with the ball/screw mechanism of the first pressurizing mechanism, a second driven gear that is connected to and rotates with the ball/screw mechanism of the second pressurizing mechanism, and a pinion gear that is arranged in meshing engagement with the first and second driven gears; and
a motor that is connected to and configured to rotatably drive the pinion gear to simultaneously rotate the first and second driven gears and move the driven pistons of the first and second pressurizing mechanisms in opposite directions.

20. The single axle suspension system set forth in claim 19, wherein the first and second driven gears are arranged on opposite sides of the pinion gear and mesh with the pinion gear at mesh points that are spaced 180 degrees apart.

* * * * *